March 13, 1928.
A. K. HADLEY
1,662,057
COMBINED MOTION PICTURE CAMERA AND PROJECTOR
Original Filed May 9, 1923    3 Sheets-Sheet 1
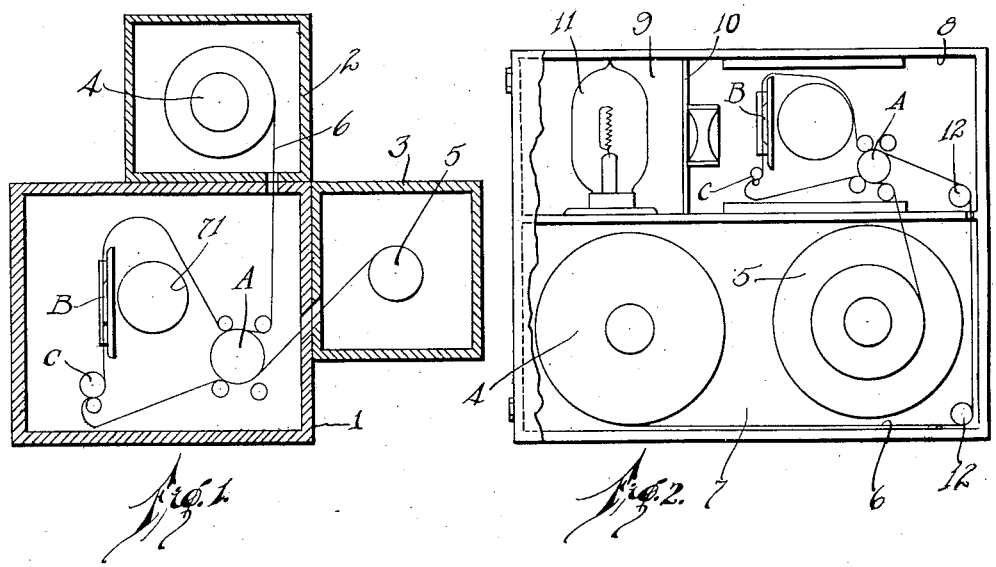
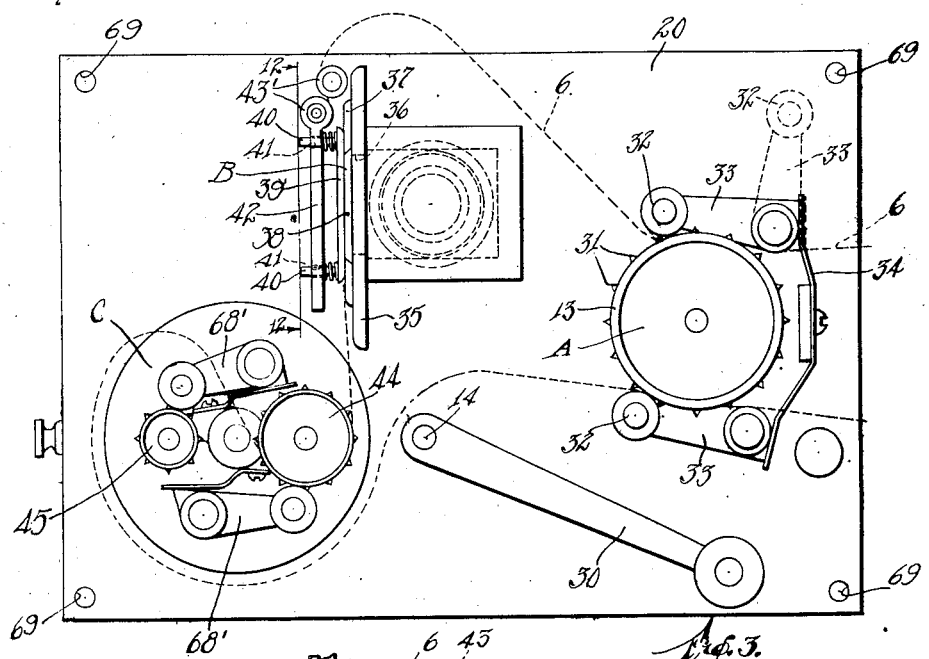
INVENTOR.
A. K. Hadley
BY
ATTORNEYS March 13, 1928.
A. K. HADLEY
1,662,057
COMBINED MOTION PICTURE CAMERA AND PROJECTOR
Original Filed May 9, 1923  3 Sheets-Sheet 2
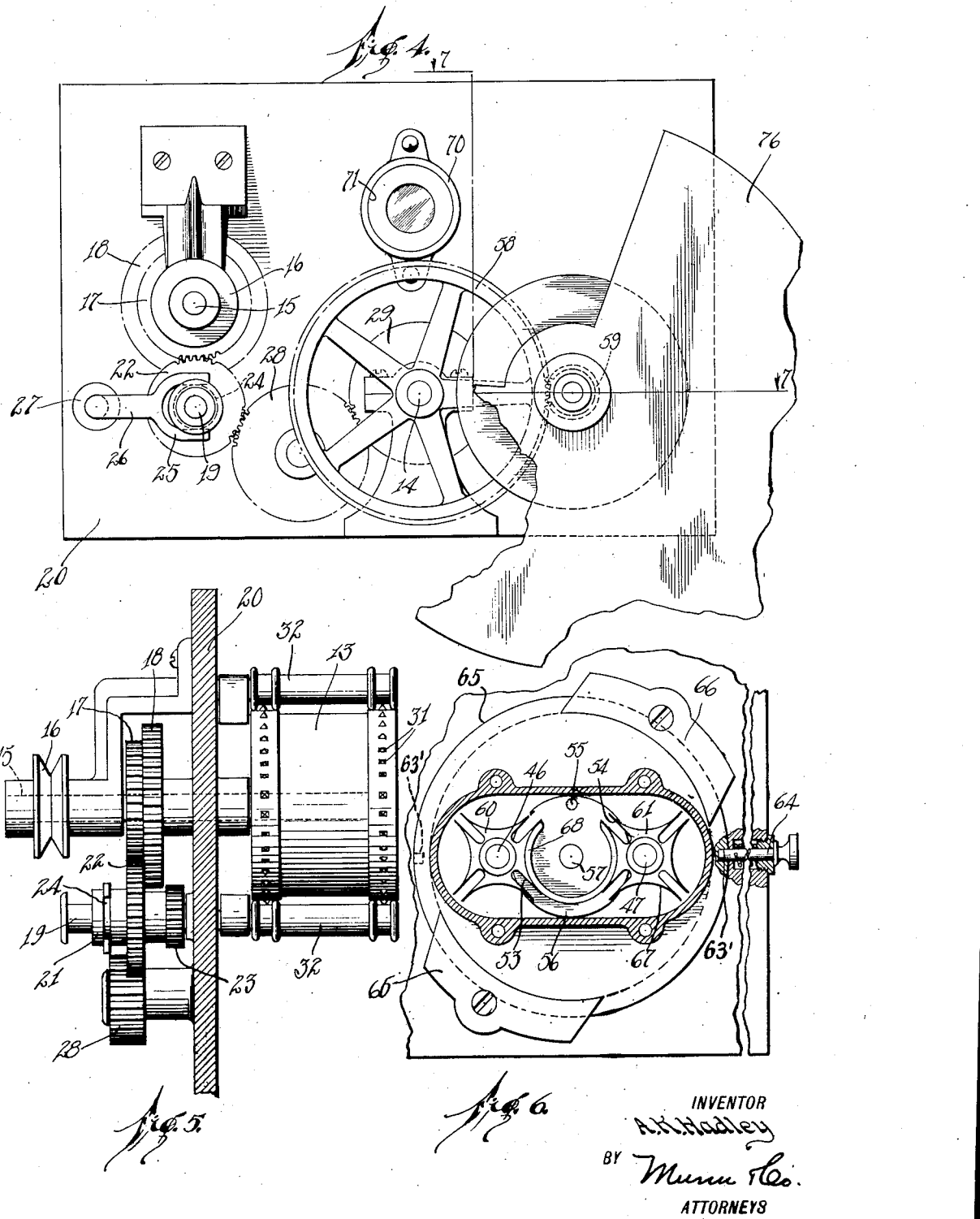

March 13, 1928.  
A. K. HADLEY  
1,662,057  
COMBINED MOTION PICTURE CAMERA AND PROJECTOR  
Original Filed May 9, 1923   3 Sheets-Sheet 3
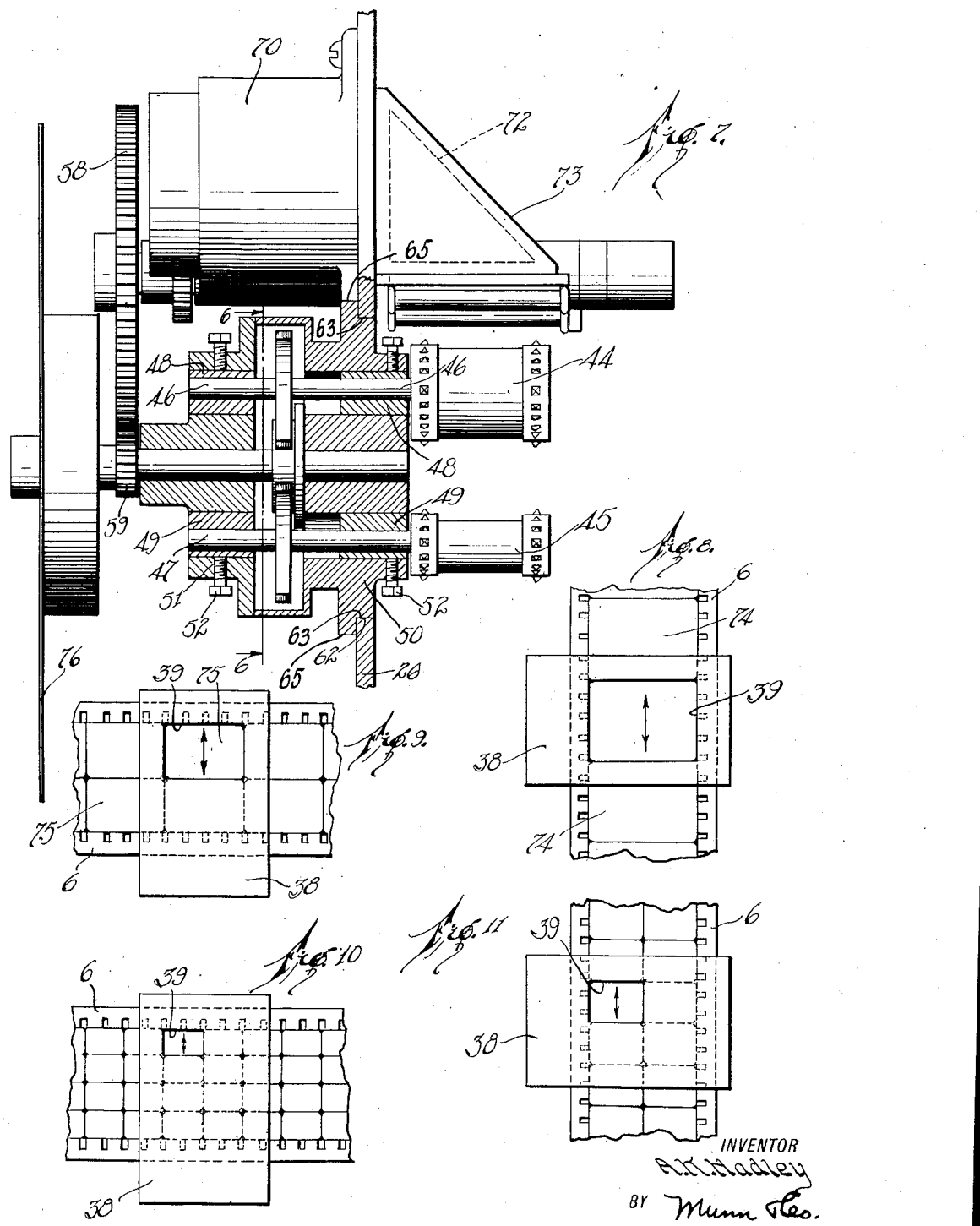
INVENTOR  
A. K. Hadley  
BY Munn & Co.  
ATTORNEYS Patented Mar. 13, 1928.

1,662,057

UNITED STATES PATENT OFFICE.

ARCHIE K. HADLEY, OF MILWAUKEE, WISCONSIN.

COMBINED MOTION-PICTURE CAMERA AND PROJECTOR.

Application filed May 9, 1923, Serial No. 637,822. Renewed September 16, 1927.

My invention relates to improvements in combined motion picture camera and projector, and it consists in the combinations, constructions, and arrangements herein described and claimed.

An object of my invention is to provide a combined motion picture camera and projector that is adapted to take a plurality of pictures on the same space that is normally occupied by one picture in the standard film.

A further object of my invention is to provide a device of the type described that is adapted to take or project pictures that occupy the same space as the pictures on a standard film or to take a plurality of pictures on this same space.

A further object of my invention is to provide a novel mechanism whereby a standard film can be fed through the device at various speeds so as to permit pictures to be taken of the standard size or smaller size, this mechanism being adjusted at the will of the operator.

A further object of my invention is to provide a device of the type described which may be used for taking or projecting standard pictures as well as pictures of smaller size.

Other objects and advantages will appear in the following specification, and the novel features of the invention will be particularly pointed out in the appended claims.

My invention is illustrated in the accompanying drawings forming part of this application, in which Figure 1 is a diagrammatic view of the device as shown disposed in a camera, Figure 2 is a diagrammatic view of the device as shown disposed in a projector, Figure 3 is a side elevation of the film moving mechanism, Figure 4 is a side elevation of the opposite side to that shown in Figure 3, Figure 5 is a side view of a portion of the film feeding mechanism, Figure 6 is a section along the line 6—6 of Figure 7, Figure 7 is a section along the line 7—7 of Figure 4, Figures 8 to 11 inclusive are diagrammatic views showing a standard film as being provided with standard pictures or with pictures occupying $\frac{1}{2}$, $\frac{1}{4}$, or one-eighth the space occupied by the standard picture, and Figure 12 is a section along the line 12—12 of Figure 3.

In carrying out my invention I provide a mechanism that is adapted to feed a standard film to a photographing or projecting aperture, and be carried away from the aperture, and is also provided with an intermittent mechanism for moving the film intermittently past the aperture. The feeding mechanism is indicated generally at A, the aperture at B, and the intermittent mechanism at C.

In Figures 1 and 2 I have shown the device operatively applied to a camera, and to a projector. In Figure 1, the device is disposed in a box 1, the box being provided with a film feeding compartment 2 and a film take-up compartment 3. The compartment 2 has a film feeding reel 4 and a film take-up reel 5. The standard film 6 is fed from the reel 4, and passes through the film feeding device A, past the photographing aperture B, through the intermittent mechanism C, again through the mechanism A, and through the take-up reel 5, as shown diagrammatically in Figure 1.

In Figure 2 I have shown the device applied to a projector. In this case, the feed take-up reels 4 and 5 are disposed in a compartment 7, while the device is disposed in a compartment 8 that is separated from a compartment 9 by a partition 10, the compartment 9 having an illuminating means 11 disposed therein. The film 6 in the projector is fed from the reel 4 past the idlers 12, thence to the feeding mechanism A, past the projecting aperture B, the intermittent mechanism C, the feed mechanism A, and to the take-up reel 5. The reels 5 are rotated by a mechanism hereinafter described.

In Figures 3 and 5 I have shown the mechanism for unwinding the film 6 from the feed reel 4 and for winding the film upon the take-up reel 5. This mechanism also feeds the film to the photographing or projecting aperture B and to the intermittent mechanism C. This mechanism consists of a spool 13 that is operatively connected to a shaft 14 by means of a gear train. The spool 13 is mounted upon a shaft 15, the shaft in turn carrying a pulley 16 and two gears 17 and 18. It will be noted from Figure 5 that the gear 18 is of larger diameter than the gear 17. The pulley 16 is operatively connected to the take-up reel 5 by means of a cable, (not shown) whereby the reel is rotated when the device is running so as to wind up the used film 6.

A stub shaft 19 is carried by the frame 20 and has a collar 21 slidably disposed thereon. The collar is provided with a large gear 22 that is adapted to mesh with the small gear 17 and is also provided with a small gear 23 that is adapted to mesh with the large gear 18. The gears 22 and 23 are spaced from each other, whereby only one of the gears will be engaging with its respective gear on the shaft 15 at one time. In Figure 5 I have shown the gear 22 in mesh with the gear 17. When it is desired to move the gear 22 out of engagement with the gear 17 and to bring the gear 23 into mesh with the gear 18, it is only necessary to move the sleeve 21 away from the plate 20. It will be noted that the shaft 15 will be rotated at a slower speed when the gears 23 and 18 are in mesh than it will be when the gears 22 and 17 are in mesh with each other. In the present form of the device, I have made the gears 17 and 18, 22 and 23, of predetermined diameters so as to cause the shaft 15 to rotate at twice the speed when the gears 23 and 18 are in mesh than it will be rotated when the gears 17 and 22 are in mesh with each other.

The means for moving the sleeve 21 so as to cause the gears 22 and 23 to mesh with their respective gears 17 and 18 is clearly shown in Figures 4 and 5. The sleeve 21 is provided with a groove 24 in which the forked end 25 of an actuating handle 26 is slidably disposed. The handle 26 is turned at right angles and is slidably carried by a bushing 27 in the plate 20. The handle 26 may be provided with a knob (not shown), whereby the handle may be moved in the bushing 27 so as to cause the sleeve 21 to bring either of the gears 22 or 23 into engagement with its respective gear 17 or 18 at the will of the operator. The purpose for the two speeds at which the shaft 15 may be turned will be hereinafter described.

The gear 22 is always in mesh with a gear 28 no matter whether the gear 22 is out of mesh or in mesh with the gear 17. The gears 22 and 23 are rigidly secured to the sleeve 21, and will therefore always be rotated when the device is running. The gear 28 in turn is in mesh with the gear 29 that is rigidly secured to the shaft 14, (see Figure 4). The shaft 14 may be rotated by means of the crank handle 30 or by means of a motor, (not shown). The shaft 14 is rotated at a certain speed so as to cause the spool 13 to feed the required amount of standard film to and from the photographing or projecting aperture.

In Figure 3 it will be noted that the spool 13 has teeth 31 that are adapted to be received in the openings which are provided in the standard film. Spring pressed rollers 32 hold the film 6 in engagement with the spool 13. The rollers 32 may be swung away from the spool 13 when it is desired to mount another film upon the spool 13. The rollers 32 are readily held in inoperative position, since they are mounted upon arms 33 that are engaged by the ends of a leaf spring 34. The spring yieldingly holds the arms in the position shown by the full lines in Figure 3, or in the dotted line position. From the feeding spool 13, the film 6 is fed to the photographing or projecting aperture that is indicated generally at B, (see Figures 3 and 12). In Figure 12 I have shown a plate 35 that is mounted upon the plate 20 and is disposed at right angles thereto. The plate 35 has an opening 36 therein. Guides 37 are secured to the plates 35 and are disposed adjacent to the sides of the opening 36. A slide 38 is disposed between the guides 37 and has an opening 39 therein. The opening 39 shown in Figure 12 has an area of one-fourth the size of the area of the standard picture of a moving picture film. In Figures 9 to 11 inclusive I have shown the various types of plates 38 that are used with the device. Figure 8 shows a plate 38 that has an opening of the same size as a picture on the standard film, while Figures 9, 10, and 11 show plates 38 that have openings one-half, one-fourth, and one-eighth the size of the opening shown in Figure 8.

A pressure plate 39' is yieldingly held in engagement with the plate 38 and is adapted to hold the film against the plate 38, yet at the same time permit the film to be moved past the plate. Pins 40 are carried by the plate 39 and are slidably received in openings 41 of a plate 42 that in turn is carried by the plate 20. The plate 42 has an opening 43 therein. The film is fed from the spool 13 between two idler rollers 43', between the plates 38 and 39', and down to an intermittent mechanism now to be described. The pictures on the film 6 are adapted to be aligned with the opening 39 and then to be moved on by the intermittent mechanism. As heretofore stated, the opening 39 is one-fourth the size of the picture on a standard film. In case the film 6 which is being fed between the plates 38 and 39 has pictures on it one-eighth or one-half of the picture provided on the standard film, a different slide 38 would be used, which would have an opening that would be of the same size as the picture on the film. The intermittent mechanism is adapted to move the film past the plate or slide 38 at various speeds so as to align the pictures with the opening in the slide no matter what size the pictures on the film may be.

The intermittent mechanism is clearly shown in Figures 3, 6, and 7. The film is fed from the photographing or projecting aperture to a spool 44 or a spool 45. The spool 44, (see Figure 3) is larger than the spool 45, and is adapted to move the film past the plate 38 at the same speed as the standard film is moved in the standard machine. The spool 45 is adapted to move the film 6 past the slide 38 at one-half the speed at which the film is moved by the spool 44. The mechanism for rotating the spools 44 and 45 rotates the spools at the same speed, but the spool 45 is made smaller in diameter than the spool 44 so as to only move the film at one-half the speed at which the spool 44 moves the film. It will be noted from Figure 7 that the spools 44 and 45 are mounted upon shafts 46 and 47, these shafts in turn being rotatably disposed in bushings 48, 48, and 49, 49. The bushings 48 and 49 have bores eccentrically disposed therein, these bores rotatably receiving the shafts 46 and 47 respectively. The bushings are carried by a housing 50 and a cover plate 51. A rotation of the bushings 48 and 49 will cause the shafts 46 and 47 to be moved toward or away from each other. Set screws 52 are adapted to hold the bushings 49 in adjusted position.

The shafts 46 and 47 are intermittently rotated by what is commonly known as the Geneva movement, (see Figure 6). A star wheel is carried by each of the shafts 46 and 47, the star wheels having slots 53 and 54 that are adapted to receive a pin 55. The pin is carried by a disc 56, the disc in turn being mounted upon a shaft 57 that is operatively connected to the shaft 14 by means of the gears 58 and 59. A rotation of the shaft 57 will cause the star wheels 60 and 61 upon the shafts 46 and 47 respectively to rotate through an arc of ninety degrees, during each revolution of the shaft 57. Each time the star wheels are moved they will draw another picture into registration with the opening in the plate 38. It is obvious that only one of the spools 44 or 45 moves the film 6 at a given time. In Figure 3 I have shown the large spool as being operatively connected to the film 6. If the operator desires to connect the small spool 45 with the film he merely rotates the housing 50 in which the spools are carried so as to bring the spool 45 in the position formerly occupied by the spool 44.

It will be noted from Figure 7 that the housing 50 has a circular portion 62 that is rotatably disposed in a circular opening 63. The housing is adapted to be rotated in this opening at the will of the operator. In the present form of the device I have shown means (see Figure 6) for holding the housing in adjusted position. The circular portion 62 is provided with openings 63' in which a spring pressed pin indicated generally at 64 is adapted to be received. The pin 64 is removed from the opening 63', whereupon the housing may be rotated. The pin is released and will enter the other opening 63' as soon as the housing is in the right position. The housing is then locked against further movement. The housing is prevented from lateral movement with respect to the plate 20 by means of a flange 65 that is slidably received by guides 66, (see Figures 6 and 7).

The star wheels have curved portions 67 that are adapted to slidably engage with a flange 68 carried by the disc 56. This flange prevents further rotation of the star wheels after they have once been turned by the pin 55. It is obvious that if the curved portions 67 are spaced slightly from the flange 68 the shafts 46 and 47 would rock slightly before the curved portion would engage with the flange to prevent further movement of the shafts. The bushings 48 and 49 permit the shafts to be moved toward or away from each other so as to cause the curved portion 67 to closely contact with the flange 68, and further prevent any rocking of the shafts 46 and 47 after they have once been turned by the pin 55.

The film is held in engagement with the desired spool 44 or 45 by means of spring pressed rollers 68'. The film is fed from the intermittent mechanism to the spool 13. The spool 13 in turn feeds it to the take-up reel 5.

From the foregoing description of the various parts of the device, the operation thereof may be readily understood. Assume that the operator desires to take pictures with the device. It will be noted from Figure 3 that the device is provided with openings 69 in the plate 20, whereby the plate may be detachably secured in the compartment 1. The lens indicated generally at 70 is aligned with the opening 71 in the box 1 when the device is disposed in place. The light rays passing through the lens 70 and into the box 1 are turned at right angles by means of the prism 72 that is enclosed by a cover 73. The prism directs the light so that it will pass through the opening 36 in the plate 35 and the opening 39 in the plate 38. When taking pictures a slide plate is substituted for the plate 38 so that all the light rays will be received by the film that is disposed adjacent to the plate 38. The film is intermittently fed past the plate 38 by means of the mechanism C and will take pictures of the desired scene.

If it is desired to take the ordinary sized pictures on the standard film the operator actuates the handle 26 so that the gears 22 and 17 will mesh, and also turns the housing 50 so as to bring the spool 44 into the position shown in Figure 3. The film will now be fed to and from the plate 38 so as to take the ordinary sized pictures on the standard film. The camera will be in the position shown in Figure 1 when taking these pictures. In Figure 8 I have shown the slide 38 that is used when taking the standard sized picture. The figures in these pictures will extend in the direction indicated by the arrow.

Assume that the operator desires to take two pictures on each plate 74 of the film 6. The size of the pictures and the position they assume on the film is clearly shown in Figure 9. It will be noted that the opening 39 in the plate 38 is one-half the size of the opening 39 shown in Figure 8. The figures on the plates 75 in the film 6 shown in Figure 9 will extend at right angles to the figures shown in Figure 8, i. e., in the direction of the arrow. It is obvious, therefore, that when taking these pictures the camera shown in Figure 1 will have to be turned into a position at right angles to the position shown in Figure 1. Pictures 75, in the form shown in Figure 9 will be moved sidewise instead of vertically, as is the case in Figure 8. The film 6 is moved at the same speed when taking the pictures 74 or when taking the pictures 75.

When taking pictures one-fourth or one-eighth the area of the picture 74, the film is fed through the machine at one-half the usual speed. The same film is moved twice through the device when the pictures 75 are being taken. It will also be noted that the film is fed twice through the device when taking pictures one-fourth the size of the pictures 74, i. e., the size of the pictures shown in Figure 11. In like manner, the film must be fed through the device eight times when taking pictures one-eighth the size of the pictures 74. The pictures one-half, one-fourth, or one-eighth the size of the pictures 74 are magnified to a greater extent than are the pictures 74 so that they will appear the same size when they are thrown on the screen. The film 6 is adapted to carry twice the number of pictures 75 than are carried by the film 6 that has the standard pictures 74 thereon. The film 6 in Figure 11 is adapted to carry four times the number of pictures as the film 8 carries, and the film in Figure 10 is adapted to carry eight times as many pictures. This results in a great saving of film since a large number of pictures can be disposed in the same space as was formerly occupied by a relatively few number of pictures that are the size of the standard pictures.

The large spool 44 intermittently moves the film past the slide 38, the slide having an opening of the size of the standard picture when it is taking or projecting the pictures of standard size, and having an opening of one-half the size, or the same size as one of the pictures 75 when it is taking or projecting pictures of one-half the size of the pictures 74. The small spool 45 is used when the operator desires to take or project pictures of one-fourth or one-eighth the size of the pictures 74. As heretofore stated, the camera or projector is turned upon its side from the position shown in Figure 1 when taking pictures of one-half or one-eighth the size of the pictures 74. The device is provided with the ordinary shutter 76, this shutter cutting the light off when the pictures are being moved past the opening in the plate 38. When projecting the pictures, the film is run through the device in the manner shown diagrammatically in Figure 2. The opening 43 in the plate 39 permits the light rays from the light 11 to pass through the film, the prism, 72, the lens 70, and to be projected upon the screen. The projector can readily accommodate a film having the standard size pictures thereon or a standard film having pictures of one-half, one-fourth, or one-eighth the size of the standard pictures. The operator merely changes the speed of the spool 13 by means of moving the handle 26 and adjusts the intermittent mechanism for the different speeds at which the film is to be fed through the device. The principal object of the invention is to provide a device which can readily accommodate a film having standard pictures thereon or a film having pictures of less size than the pictures on the standard film.

I claim:

1. In a device of the type described, a moving picture machine having a film taking or projecting aperture therein and intermittent mechanism for moving a standard film past the aperture at various speeds, said mechanism comprising a plurality of spools of different diameters each adapted to be operatively connected to the film, common means for actuating said spools, and means for moving any one of said spools into operative engagement with the film, means for feeding the film to said spools, and means for changing the speed of said film feeding means.

2. In a device of the type described, a support, a housing rotatably carried by said support, a plurality of spools of different diameters carried by said housing and being adapted to move a film at different speeds, common means for actuating said spools, said housing being adapted to be rotated to bring any spool desired into operative engagement with the film, means for feeding the film to said spools, and means for changing the speed of said film feeding means.

3. A device of the type described comprising a frame having an aperture therein for taking or projecting pictures, means for feeding a film to said aperture, intermittent means for moving said film away from said aperture, said intermittent means comprising a plurality of spools of different diameters, each adapted to be operatively connected to the film, common means for actuating said spools, a driving shaft operatively connected to said common means and said film moving means, means for changing the speed of said film feeding means when the film is connected to a spool that is removing the film from the aperture at a different speed than is required to project a standard film, and plates having openings therein of various sizes and adapted to be placed over said aperture, so as to permit pictures of various sizes other than the standard size to be projected.

4. A device of the type described, a plurality of spools of different diameters adapted to move a standard moving picture film, common means for intermittently actuating said spools whereby said film will be moved at different speeds when connected to the different spools, means for feeding the film to and from said spools, and means for changing the speed of said film feeding means.

5. A device of the type described comprising a frame having an aperture therein for taking or projecting pictures, means for feeding a film to said aperture, intermittent means for moving said film away from said aperture, said intermittent means comprising a plurality of spools of different diameters, each adapted to be operatively connected to the film, common means for actuating said spools, a driving shaft operatively connected to said common means and said film moving means, and means for changing the speed of said film feeding means when the film is connected to a spool that is removing the film from the aperture at a different speed than is required to project a standard film.

6. An intermittent mechanism comprising a supporting frame, a body portion rotatably carried by said frame, film-actuating spools carried by said body portion, said body portion being rotatable to bring either one of the spools into engagement with the film, said spools being of different diameters for moving the film at different speeds, film-guiding means for conveying the film to and from either one of said spools, and means for locking said body portion in adjusted position.

ARCHIE K. HADLEY.